F. R. HUNT.
Combined Car-Coupling, Heater, Joint and Brake-Pipe.

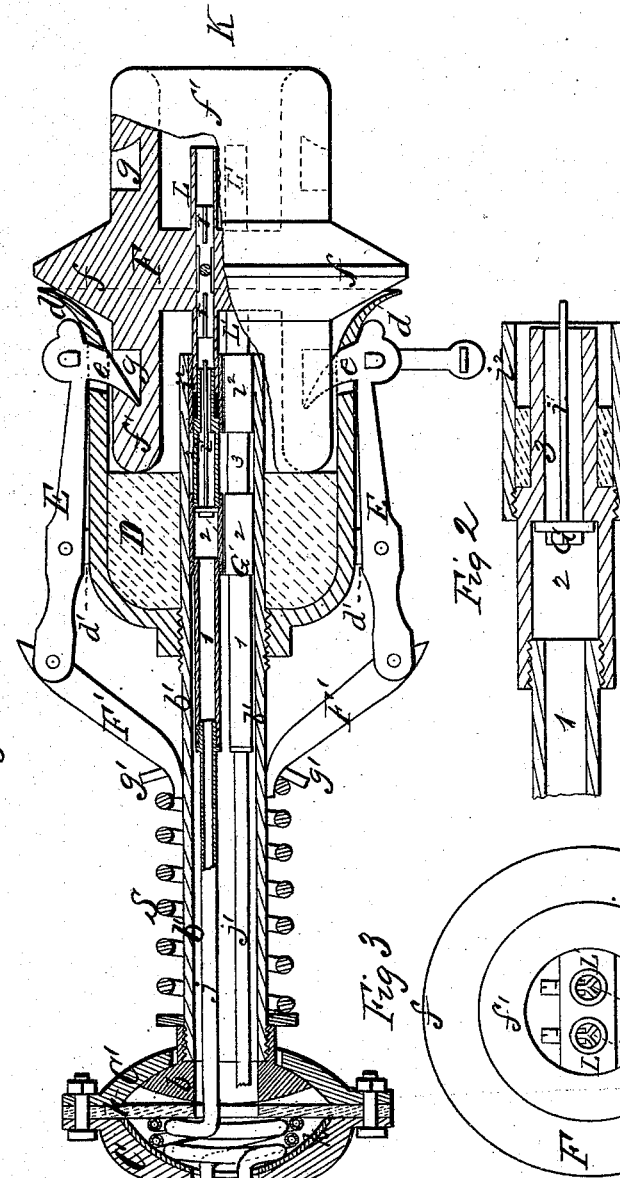

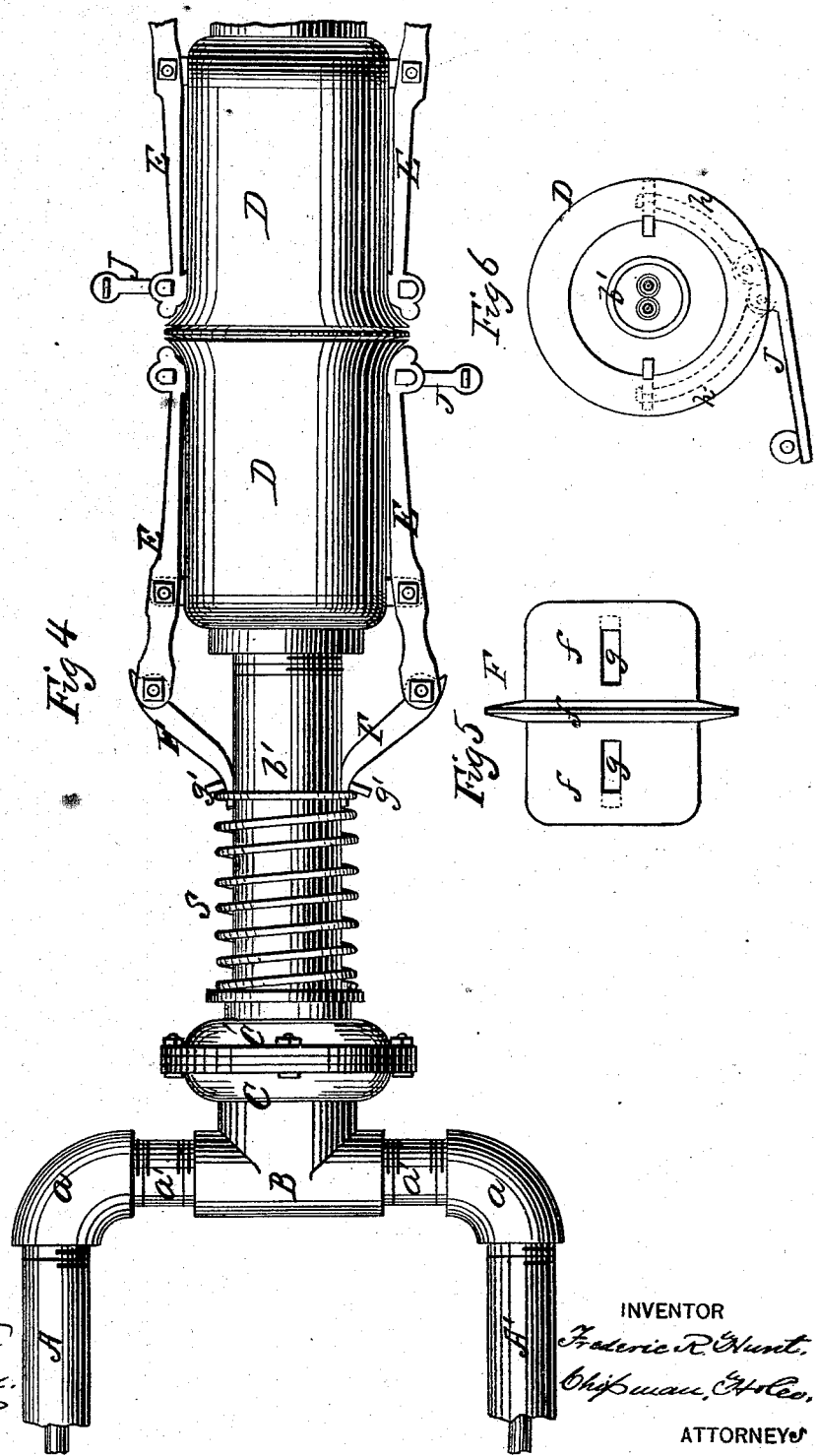

No. 159,679.

Patented Feb. 9, 1875.

4 Sheets--Sheet 3.

WITNESSES
E. H. Bates
Geo. E. Upham

INVENTOR
Frederic R. Hunt
Chipman Hosmer & Co.
ATTORNEYS

THE GRAPHIC CO. PHOTO-LITH. 39 & 41 PARK PLACE, N.Y.

F. R. HUNT.
Combined Car-Coupling, Heater, Joint and Brake-Pipe.

No. 159,679.

4 Sheets--Sheet 4.

Patented Feb. 9, 1875.

WITNESSES
E. H. Bates
Geo. E. Upham

INVENTOR
Frederic R. Hunt
Chipman Hosmer & Co.
ATTORNEYS

UNITED STATES PATENT OFFICE.

FREDERIC R. HUNT, OF LEAVENWORTH, KANSAS.

IMPROVEMENT IN COMBINED CAR-COUPLINGS, HEATER-JOINTS, AND BRAKE-PIPES.

Specification forming part of Letters Patent No. 159,679, dated February 9, 1875; application filed January 19, 1875.

*To all whom it may concern:*

Be it known that I, FREDERIC R. HUNT, of Leavenworth, in the county of Leavenworth and State of Kansas, have invented a new and valuable Improvement in a Combined Car-Coupling, Heater-Joint, and Brake-Pipe; and I do hereby declare that the following is a full, clear, and exact description of the construction and operation of the same, reference being had to the annexed drawings, making a part of this specification, and to the letters and figures of reference marked thereon.

Figure 7:
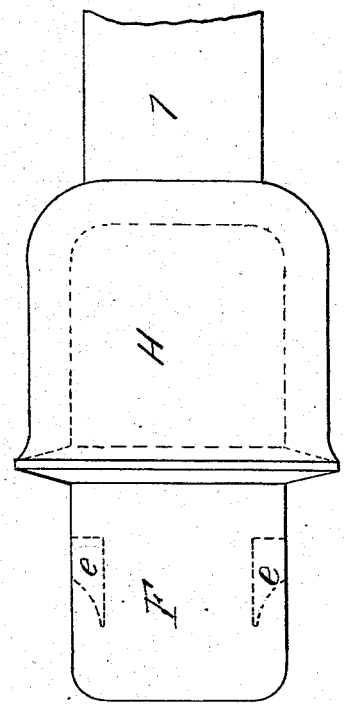
Figure 8:
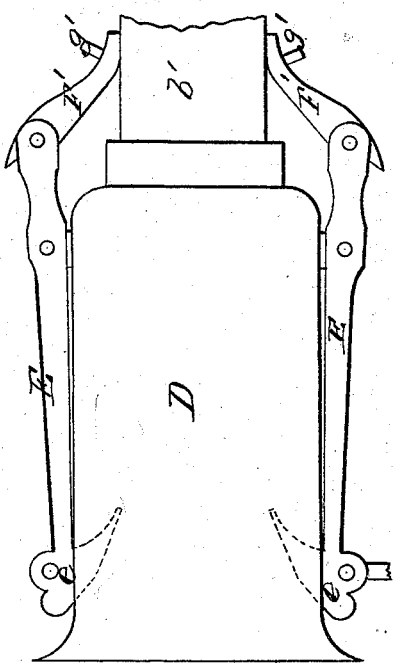
Figure 9:
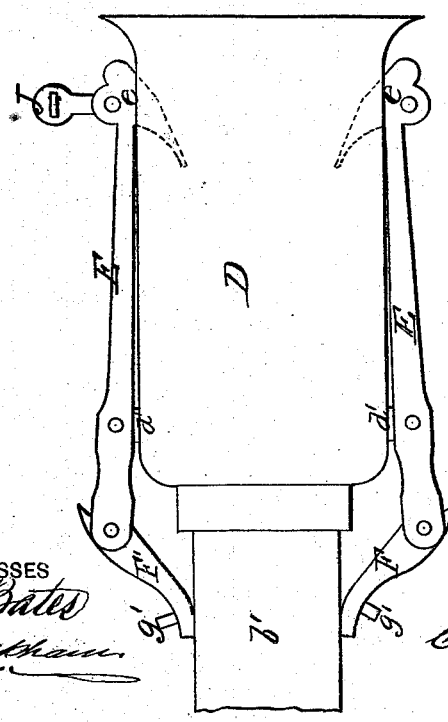
Figure 10:
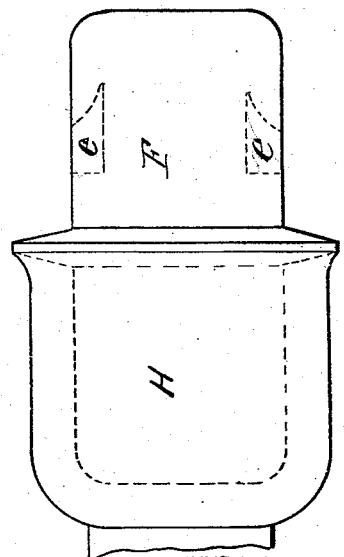
Figure 11:
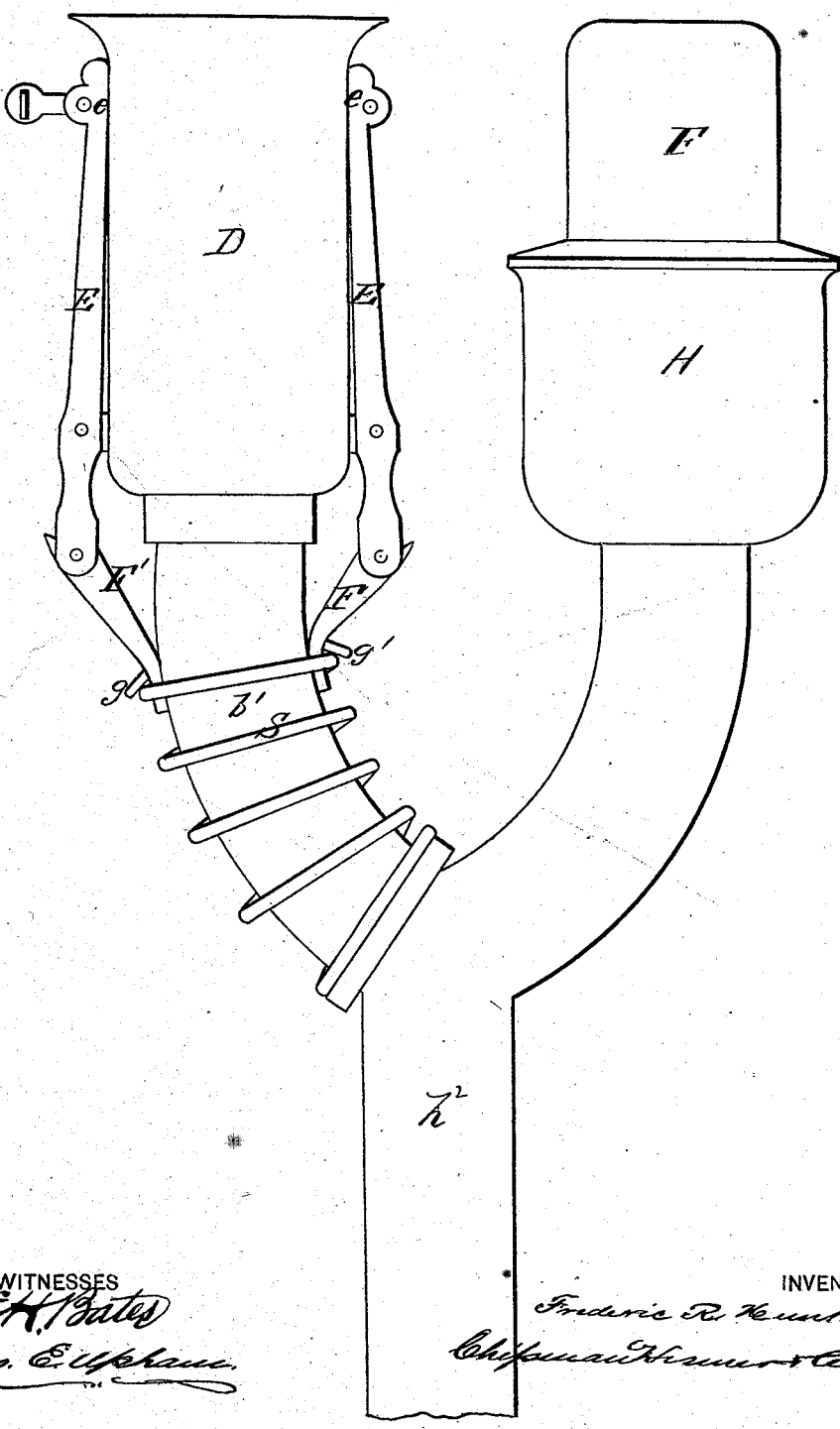

Figure 1 of the drawing is a representation of a longitudinal vertical section of my device, and Figs. 2 and 3 are detail views of the same. Fig. 4 is a plan view; and Figs. 5, 6, 7, 8, 9, and 10 are detail views. Fig. 11 is a plan view of the same.

This invention has relation to improvements in that class of car-couplers for which Letters Patent of the United States were issued to me bearing date of March 15, 1870, and numbered 100,896, wherein were described and claimed tubular draw-heads and couplers, adapted for use as conduits for currents of hot or cold air for heating or ventilating cars.

The nature of the invention consists, mainly, in combining, with such a tubular draw-head, having pipes leading to a heating-furnace, pipes for operating steam-brakes, arranged within the former, and adapted to engage automatically with similar pipes similarly arranged within the draw-bar and pipes of another car, whereby the said tubular draw-bars and pipes, when used for heating cars by hot air, serve as heating-jackets for the pipes operating the steam-brakes, thereby guarding the steam within the same from condensation and consequent freezing, and rendering the brakes at all times operative. It also consists in combining, with cup-shaped draw-heads upon the ends of the pipe leading to the furnace, tubular cylindrical coupling devices, adapted to be received within the flaring mouths of the said draw-heads, forming air-tight joints therewith, which links are provided with notches, adapted to be automatically engaged with hooked devices upon the front of vibrating levers actuated by a spring, whereby the coupler is made automatic, and the current of hot air continuous from each car to the one next in rear. It also consists in combining, with the pipes actuating the steam-brakes, arranged within the tubular heat-conducting draw-bars and pipes, tubes within the cylindrical coupling-links, adapted to be automatically engaged over the ends of the steam-brake pipes when the cars are coupled, whereby they are made continuous from end to end of the train, steam being prevented from escaping from their open ends by means of slide-valves arranged therein, and automatically forced against suitable seats. It furthermore consists in combining, with the said valves arranged in the ends of the steam-pipes, detaching-slides, arranged in the coupling-tubes in the links, which, in the act of coupling cars, will thrust the said valves from their seats, allowing steam to penetrate into the brake-pipes of the car last added to the train, all as will be hereinafter more fully explained.

In the annexed drawings, A A' designate two metallic pipes, of suitable dimensions, which extend from end to end of a car, and are rigidly secured thereto under its floor, in any suitable manner. These pipes are connected, by means of elbows $a$, to other pipes, $a'$, which are in turn connected to a T-shaped joint, B, to which is attached, in any suitable manner, a cup-shaped metallic plate, C, forming, with the cup C', of corresponding dimensions, a socket for the ball $b$, applied upon the end of a pipe, $b'$. Pipe C' is rigidly secured to plate C by means of suitable bolts and nuts; and ball $b$, inclosed therein, is of a flat, double convex form, of less size than the socket, and is centrally perforated, for a purpose hereinafter explained. D indicates a hollow cup-shaped draw-head, screwed or otherwise suitably secured upon the outer end of pipe $b'$, which end projects a certain distance into the said cup toward its flaring mouth $d$. This draw-head is preferably of cast-iron, though it may be, also, of steel, or of wrought metal; and it is provided with lugs $d'$, projecting from the outer surfaces of the same, which lugs are designed to serve as fulcrums for vibrating levers E, operating hooks $e$ upon their ends, and are either a component part of the said draw-heads or separately constructed therefrom, and subsequently secured to the said draw-heads in positions diametrically opposite each other. Hooks $e$ of levers E project through slots in the walls of the draw-heads a considerable distance, as shown in Fig. 1, for a purpose hereinafter explained. F designates a tubular cylindrical coupler having a central flange, $f$, dividing the same into two equal parts, $f'\ f'$, which parts are of such dimensions as that they shall be received within the hollow interior of draw-heads D, as shown in Fig. 1, forming therewith a rigid air-tight joint. Parts $f'$ of coupler F are provided with notches $g$, adapted to receive the hooks $e$ of levers E, their engagement being preserved in the following manner, to wit: Metallic rods F' are pivotally secured to the power-arms of levers E, extending thence rearwardly a certain distance beyond the joint of pipe $b'$ with the draw-head, their ends being provided with pin $g'$, abutting against a suitable helical spring, S, coiled about the body of pipe $b'$. When link F is arranged in the open face of one draw-head, as shown in Fig. 1, and a second car is approached to be coupled, the other end of the said link will be directed inward into the flaring mouth of the other draw-head, raising hooks $e$, until flange $f$ strikes against the face of the said draw-head, when the said hooks will become engaged in notches $g$, such engagement being accelerated, effected, and rendered positive by the recoil of spring S, and a coupling will be effected.

To effect an uncoupling I use the following device: Two curved metallic rods, $h\ h'$, having one of their ends engaged in a perforation in the free ends of levers E, are pivoted together. An actuating-lever, J, is then pivoted to one of the rods, with its fulcrum upon the contiguous end of the other rod, so that when the lever is actuated the said rods will be forced against the cylindrical outer surface of the draw-heads, thereby separating their power ends, withdrawing hooks $e$ from slots $g'$, and allowing the cars to be separated. By means of plate C C' and ball $b'$ upon the end of pipe $b$, a ball-and-socket vibratory motion in every direction is allowed to the draw-head, which, with all its connections, is rendered air-tight, so that hot air, produced by any suitable furnace, and admitted into the pipe and tubular draw-bars, will be conducted from end to end of the train, and may be discharged through suitable eductors and registers into the interior of each car.

I designates metallic steam-pipes, for operating the brakes arranged within the hollow interior of pipes A A', extending thence, by means of elbows $i$ through their various connections into the interior of socket C C', where they are spirally coiled in opposite directions, the coiled part being of tubular spring steel. They thence extend in two branches, $j\ j'$, through ball $b$, nearly to the end of pipe $b'$, as shown in Fig. 1, where they are screwed into sections of pipe 1, fitted into pipes 2 of larger size, which latter are then screwed into another smaller section of pipe 3. G designates a valve arranged in section 2 of pipe, provided with a valve-stem, $i^1$, extending, when the valve is on its seat, against the rear end of pipe 3 out beyond the end of pipe 3, even with the end of a sleeve, $i^2$, rigidly secured upon the outer free end of pipe 3. L L' designate two tubes, rigidly secured side by side, within coupling-links F, the same being of such a size as that they shall freely receive within them the ends of pipes 3. Within these pipes are arranged detaching-slides $r$, which are prevented from undue penetration into the interior of pipes L L' by means of thumb-screws, which pass through a metallic block supporting the said pipes into slots in the said slides, which latter are Y-shaped in cross-section, the spaces between the legs being open for the purpose of allowing the steam free and unobstructed passage through the said pipes.

When the cars are coupled together, as above described, pipes L L' fit snugly over the ends of pipes 3, the last draw-bar presenting the appearance shown. If, now, another car be added to the train in the act of coupling the same, pipes L L' become engaged with the ends of pipes 3, slides $r$ in the former striking the projecting end of the valve-stem and throwing valve G off its seat, allowing steam to rush into the brake-pipes of the last car, closing valve G and preventing waste steam. In detaching a car, valve G is relieved of the restraint of slide $r$, and is thrust against its seat, preventing the escape of steam through the open end of pipe 3.

In practice, instead of inclosing the ends of the brake-pipes in one draw-bar, as above described, I may use a supplementary draw-bar, H, shown in Fig. 11 of the drawings, which, as well as draw-bar D, springs from a common tubular stem, $h^2$, each draw-bar containing one of the ends of the steam-brake pipes.

I also propose to use a rubber cushion, $k$, in rear of the coil of the steam-pipes, for the purpose of softening the shock, as well as a washer, $k'$, between cup-plates C C', for a similar purpose. These coils, which possess in a measure the function of the well-known bunter-spring, are more especially designed to compensate for the lateral play of the draw-bar, thus preventing the brake-pipes from being racked and rendered leaky.

In practical use I propose to close the end of the draw-bar of the last car by means of a screw-plug, K, shown in Fig. 1, for the purpose of preventing the escape of hot air into the open air.

In cold weather the hot-air pipes, being full of air of high temperature, the steam-brake pipes are at all times surrounded by a jacket thereof, so that steam within them is guarded against condensation and freezing, and the brakes thus rendered at all times operative.

What I claim as new, and desire to secure by Letters Patent, is—

1. In a car-coupler, the combination, with a tubular draw-head and the pipes leading to a hot-air furnace, of the steam-brake pipes, arranged within the same, substantially as specified.

2. The combination, with the cup-shaped draw-heads D, having levers E with hooks e, of the tubular cylindrical coupling devices F, having flange f and notches g, substantially as specified.

3. The combination, with pipes 3 of draw-heads D, of the pipes L L' of couplings F, substantially as specified.

4. The combination, with pipes 3, having valve G with valve-stem i, of the pipes L L', having detaching-slides r, substantially as specified.

5. The combination, with hooked levers E and rods F', having pins g' of the spring S, substantially as specified.

6. The combination, with the coils of steam-brake pipes I, of the cushions k k', substantially as specified.

7. The combination, with the ball b of ball-and-socket joint C C' b, of the steel tubular coils of pipes I, substantially as specified.

8. The ball-and-socket joint C C' b, in combination with a tubular draw-head and pipes leading to hot-air furnace, substantially as specified.

9. The combination, with the valves G of steam-pipes 3, of the detaching devices r of pipes L L', substantially as specified.

10. The combination, with the hooked vibrating levers E, of the curved rods h h' and actuating-lever J, substantially as specified.

In testimony that I claim the above I have hereunto subscribed my name in the presence of two witnesses.

FREDERIC R. HUNT.

Witnesses:
GEORGE E. UPHAM,
JOHN B. CORLISS.